United States Patent [19]
Halfar et al.

[11] 3,856,640
[45] Dec. 24, 1974

[54] PRODUCTION OF HYDROGEN PEROXIDE

[75] Inventors: Kurt Halfar, Meinier-Geneva; Michael L. Hitchman; Wolfgang Mehl, both of Geneva, all of Switzerland

[73] Assignee: H. Dudley Wright, Geneva, Switzerland

[22] Filed: May 30, 1972

[21] Appl. No.: 257,955

Related U.S. Application Data

[63] Continuation-in-part of Ser. No. 149,194, June 2, 1971, abandoned.

[52] U.S. Cl................ 204/84, 204/265, 204/277, 204/284, 204/294
[51] Int. Cl....... C01b 15/02, B01k 1/00, B01k 3/04
[58] Field of Search................. 204/84, 83

[56] References Cited
UNITED STATES PATENTS

| | | | |
|---|---|---|---|
| 3,389,200 | 6/1968 | Olstowski et al................ | 204/294 X |
| 3,558,450 | 1/1971 | Ashe et al...................... | 204/294 X |
| 3,592,749 | 7/1971 | Gvangaard..................... | 204/208 |

*Primary Examiner*—F. C. Edmundson
*Attorney, Agent, or Firm*—Kenyon & Kenyon Reilly Carr & Chapin

[57] ABSTRACT

Dilute aqueous hydrogen peroxide solutions which are suitable for a variety of purification and disinfection applications are obtained economically by cathodic reduction of oxygen on an electrode composed of a gas-permeable but liquid-impermeable membrane comprising finely divided, highly porous carbon dispersed throughout a sintered fluorocarbon polymer, such as polytetrafluoroethylene.

4 Claims, 4 Drawing Figures

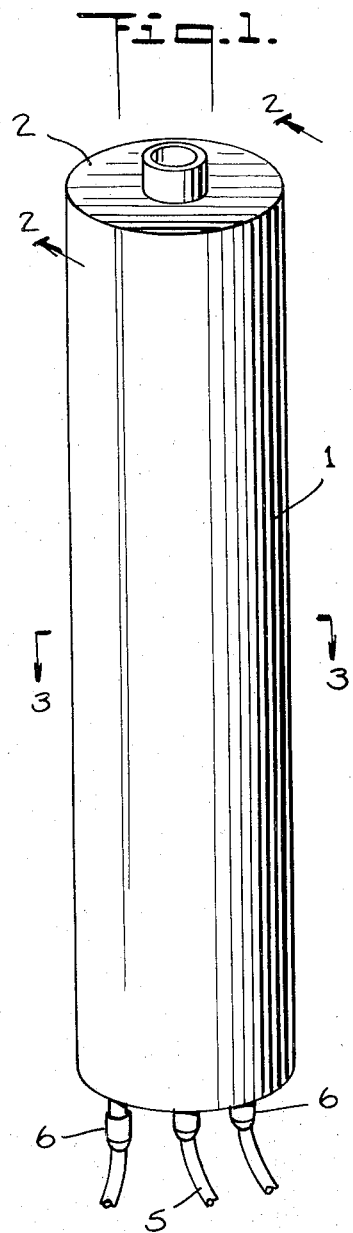
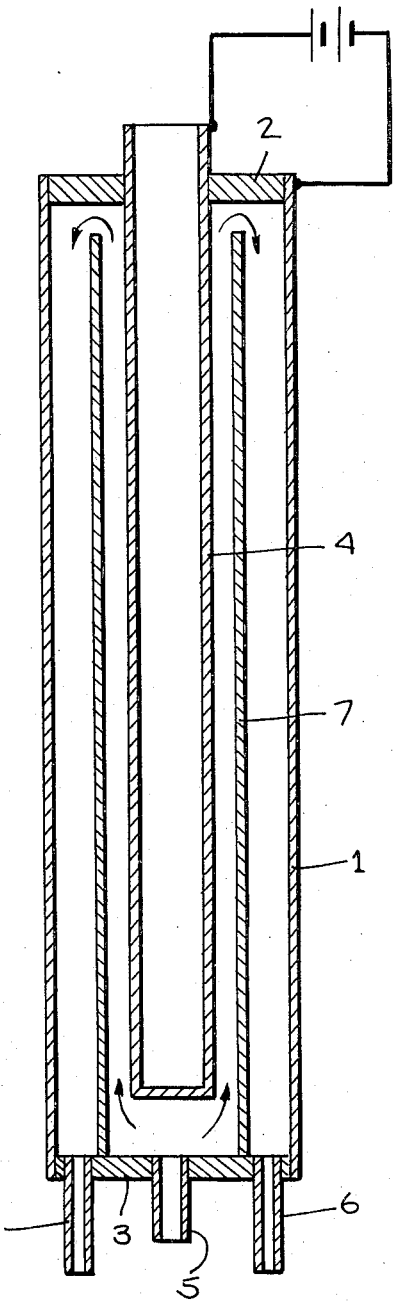
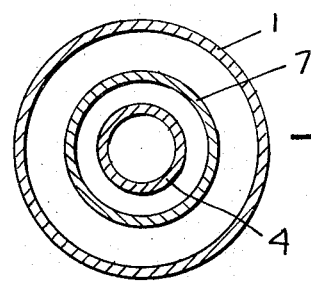

PRODUCTION OF HYDROGEN PEROXIDE

This application is a continuation-in-part of Ser. No. 149,194, filed June 2, 1971, now abandoned.

This invention relates to the production of hydrogen peroxide. More particularly, this invention is concerned with the production of low-cost, dilute aqueous solutions of hydrogen peroxide by cathodic reduction of oxygen. In a more particular aspect, this invention concerns a semi-permeable membrane of carbon dispersed in a fluorocarbon polymer which is useful as a cathode for the production of hydrogen peroxide by electrochemical means.

It has long been known that hydrogen peroxide has properties rendering it of potential use for environmental control, in particular disinfection (See, e.g., W. C. Schumb et al., "Hydrogen Peroxide," Reinhold, New York, (1955) and W. Machu, "Das Wasserstoffperoxyd und die Perverbindungen," Springer, Vienna (1951)). Most of these uses are based on the long established fact that hydrogen peroxide is a potent oxidizing agent (See e.g., H. J. H. Fenton, J. Chem. Soc., 65, 899 (1894), O. Masson, J. Chem. Soc., 91, 1449 (1907)) which also possesses excellent bactericidal properties, particularly in the presence of catalytic amounts of heavy metal ions like $Fe^{2+}$, $Mn^{2+}$, $Ag^+$, etc. (See e.g., H. R. Ditmar et al., J. Bacteriol., 19 203 (1930), L. Colbert et al., Ann. Inst. Pasteur, 102, 278 (1962)).

Hydrogen peroxide seems particularly useful for the removal of various forms of organic impurities, including phenols, from water and it is very effective for the destruction of cyanides. Because of its excellent disinfecting properties, applications in the food processing industry, e.g., dairy farms, slaughterhouses, etc., have frequently been discussed as well as uses for sterilization of drinking and swimming pool water.

One of the major advantages of the use of hydrogen peroxide in environmental control problems is that it leaves only water as a product from its own decomposition after the oxidation reaction. This is an important advantage over chlorine, the agent most frequently applied for purification and disinfection of water. On dissolution in water chlorine forms hypochlorous and hydrochloric acids:

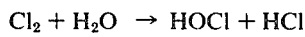

$$Cl_2 + H_2O \rightarrow HOCl + HCl$$

In contact with an oxidizable substance or under the influence of sunlight hypochlorous acid decomposes according to

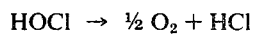

$$HOCl \rightarrow \tfrac{1}{2} O_2 + HCl$$

The lowering of the pH due to the formation of HCl is unacceptable for many applications, e.g., in swimming pools. Even if the pH value is corrected by the addition of a base, chloride ions are still present in the water. These ions rapidly corrode many metals, in particular iron and steel, and they are thus undesirable.

In addition, the clorination of waste water effluents is a very complex operation and may lead to the formation of toxic chlorine compounds. For example, if wastes containing cyanide ions are treated with chlorine, the following reactions take place:

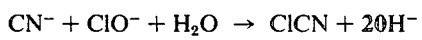

$$CN^- + ClO^- + H_2O \rightarrow ClCN + 2OH^-$$

$$ClCN + 3H_2O \rightarrow CNO^- + Cl + 2H_3O^+$$

ClCN is a short-lived intermediate at room temperature and a pH of 9 or above. If the concentration of cyanide ions exceeds 1 g/l the heat of the reaction causes the temperature to increase and free cyanogenchloride, a very poisonous compound, is formed. The same effect occurs if the acidity of the system is allowed to fall below a pH of 9.

Small traces of various phenols are frequently present in the ground water of industrialized districts. On treatment with chlorine these compounds form chlorinated phenols which, even in a dilution of 1 part per billion, give to water an unpleasant medicinal taste.

Despite the foregoing, hydrogen peroxide has not found wide use as an alternative to chlorine, primarily because of cost the price for bulk quantities of hydrogen peroxide being about 3 to 4 times that of chlorine. Also, although chlorine is highly poisonous and must be handled with great care, it is not nearly as dangerous as hydrogen peroxide, which is non-toxic but which decomposes easily into water and oxygen resulting a self-heating and rapid increase of the pressure in closed vessels with the possibility of explosions. The decomposition can be catalysed dissolved ions, in particular those of the transition metals, by the surface of solids, in particular the oxides or hydroxides of iron, lead, mercury, etc. Commercially, hydrogen peroxide is usually available in form of an aqueous solution containing 30% $H_2O_2$. Even this solution is so unstable that special precautions have to be observed in dealing with it, like extreme cleanliness of equipment which must be constructed from special materials, usually plastics or aluminum. It is the costs and the difficulties associated with the handling of hydrogen peroxide which have caused hydrogen peroxide to be rarely used for environmental control applications.

Ozone is another oxidizing agent which leaves only a harmless byproduct after its reduction, namely oxygen. On first sight it seems surprising that ozone, which is even less stable than hydrogen peroxide, should have become an important agent for water treatment. However, the handling and shipping problems for ozone have been greatly eliminated by the development of generators which form ozone by oxidation of oxygen at the place of application.

Ozone is an excellent germicide and a powerful oxidizing agent but it has several obvious disadvantages. It is expensive to make; for the production of 1 kg ozone about 20 Kwh of electricity have to be used so that, not counting labor, capital depreciation, etc., the price for 1 kg ozone will be about 20 cents, which is about three times the price of chlorine. Further, ozone is a gas with moderate solubility in water, so that special equipment is needed to assure its efficient dissolution in water. Finally, and this is the most important disadvantage, ozone has such a short residence time that water treated by it has practically no residual protection.

Hydrogen peroxide has none of these disadvantages. It is obtained as a solution in water and it is reasonably stable in low concentration, so that it gives water a considerable residual protection.

As the wide application of hydrogen peroxide for environmental protection problems seems to have been prevented mainly by the difficulties involved in its transport and handling, there exists a definite need for generators which produce hydrogen peroxide by a simple and cheap process at the place of its intended use. Unfortunately, the common industrial processes for the production of hydrogen peroxide, namely the anthraquinone process (See, e.g., U.S. Pat. No. 2,059,569), by which practically all hydrogen peroxide is now produced, or the old electrochemical process which was based on the anodic oxidation of sulfuric acid, and which was very important until about 1953, are difficult if not impossible to miniaturize in such a way that they can be dealt with by personnel that is not highly trained.

It also has long been known that hydrogen peroxide could be produced by electrolytic techniques employing cathodic reduction of oxygen. In one of the earliest processes, which is disclosed by Fischer in U.S. Pat. No. 1,128,966, issued Feb. 16, 1915, an electrolyte, preferably acidic, is saturated with oxygen or air at elevated pressures (e.g., 100 atmospheres). The oxygen was claimed to react with hydrogen formed at the cathode, which is desirably an amalgamated gold cathode, to form hydrogen peroxide. Subsequently a variety of other metal cathodes were employed. More recently, Berl, in U.S. Pat. No. 2,000,815, proposed using cathodes comprised of activated carbon deposited on a conductive porous member, such as porous graphite or metal, and passing oxygen through the electrode which he claimed reacted with the hydrogen formed at the cathode surface in contact with the electrolyte. Still more recently Grangaard, in U.S. Pat. No. 3,454,477, issued July 8, 1969, reported that it is necessary to impregnate the Berl-type cathode with a redox resin having recurring hydroquinoidal units to provide adequate yields of hydrogen peroxide.

These heretofore known electrolytic techniques suffer from one or more drawbacks. In particular, successful commercial processes have been hindered because of the inability to develop a suitable cathode. For example, in some cases, notably those employing noble metal or graphite cathodes, the cathode material catalyzes the decomposition of hydrogen peroxide to water and oxygen, thus reducing the yield. In other cases, particularly when lead or untreated carbon cathodes are employed, the hydrogen peroxide destroys the cathode. In still other cases the cathode may be deactivated through the absorption of impurities on the electrode surface. Finally, the elevated oxygen pressures required with some cells resulted in considerable strain on the cathode structure.

It is an object of the present invention to provide an improved means for producing hydrogen peroxide.

It is a further object of this invention to provide an improved electrolytic method for producing hydrogen peroxide.

Still another object of this invention is the provision of improved apparatus adapted to produce hydrogen peroxide.

Another object of this invention is to provide an improved cathode material which can be used for the electrolytic production of hydrogen peroxide.

A further object of this invention is to provide a means for economically producing aqueous solutions of hydrogen peroxide.

Another object of this invention is to produce hydrogen peroxide capable of use for environmental protection and disinfection applications.

In accordance with the present invention, there is provided an electrolytic cell having an anode, a cathode and a suitable alkaline electrolyte. The cathode comprises a semipermeable membrane composed of activated carbon and a fluorinated polymer. Oxygen is supplied to the cathode to be reduced electrochemically, the reduced species reacting with either water or alkali metal hydroxide to form an aqueous solution of hydrogen peroxide or an alkali metal salt thereof.

The present invention may be more fully understood by reference to FIGS. 1 – 4 of which:

FIG. 1 is a perspective view of one embodiment of a cell constructed in accordance with this invention;

FIG. 2 is a longitudinal cross-sectional view of the cell of FIG. 1 taken at line 2—2;

FIG. 3 is a horizontal cross-sectional view of the cell of FIG. 1 taken at line 3—3.

Figure 4:
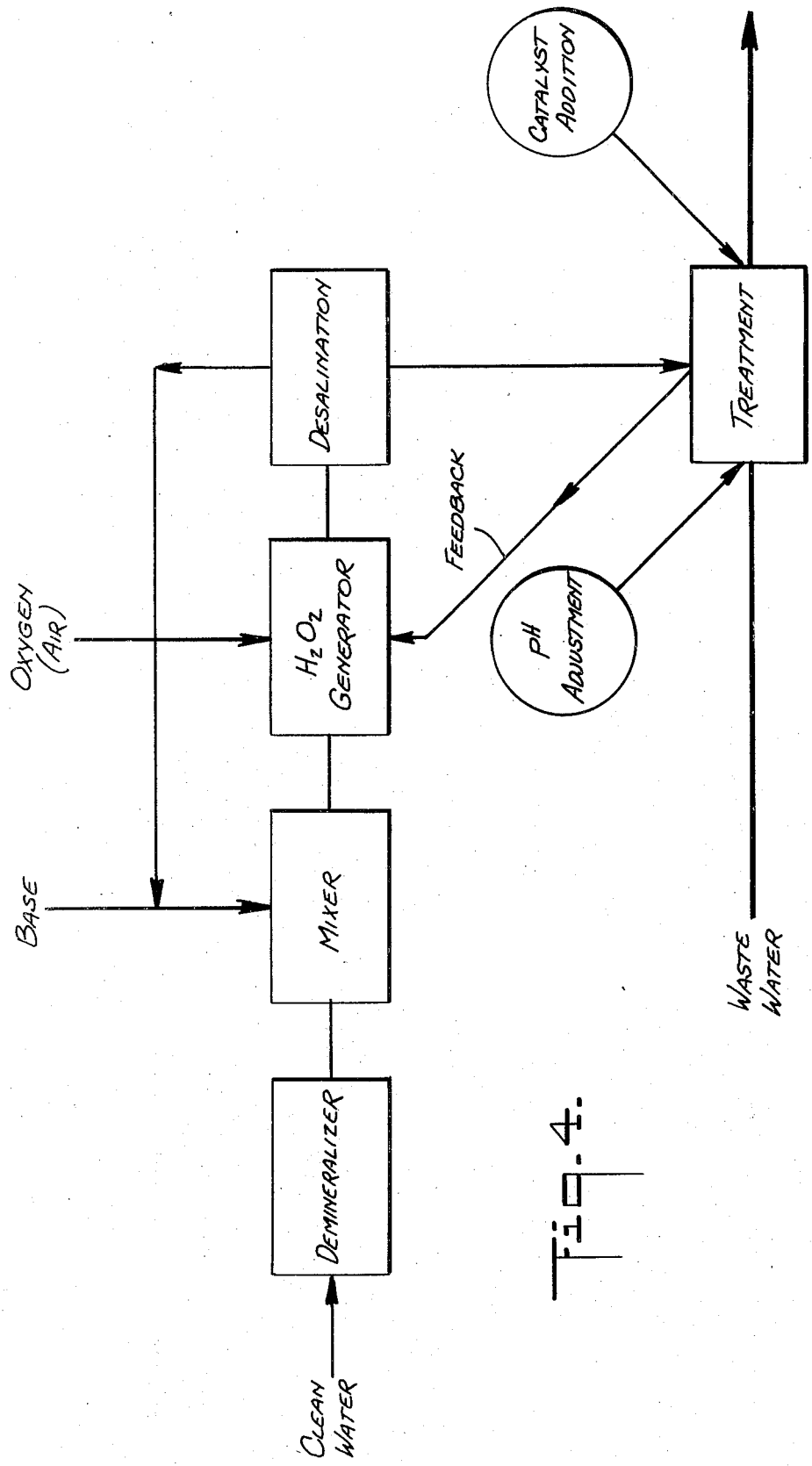
FIG. 4 is a schematic diagram of a system for generating hydrogen peroxide solutions for use in environmental control applications.

The cell as shown in FIGS. 1—3 comprises a cylindrical cathode 1 whose ends are enclosed by non-conductive, impermeable end members 2 and 3, axially mounted anode 4, electrolyte inlet means 5 and electrolyte removal means 6. In a preferred form the cell is provided with annular separator 7 between and spaced from cylindrical cathode 1 and axial anode 4. Anode 4 extends through one end member, e.g., member 2, and toward but short of the opposed end member, e.g., member 3. Separator 7 is in contact with opposed end member 3 and extends toward but short of the first end member 2. Opposed end member 3 is also provided with axial electrolyte inlet 5 and a plurality of radially positioned electrolyte outlets 6. Thus electrolyte is introduced into the cell through inlet 5, passes through an anode annulus between anode 4 and separator 7, then through the cathode annulus between cathode 1 and separator 7 and out through outlets 6. The outside of cathode 1 is exposed to oxygen gas, which diffuses through cathode 1 to be reduced to hydrogen peroxide.

It should be noted that while the embodiment of FIG. 1 is preferred, still other arrangements can be employed without departing from the spirit of this invention. For example, cells of the type disclosed by Berl and Grangaard may be employed.

The cell can be contacted with pure oxygen or with gas mixtures including oxygen, such as air. The gas pressure can be above or below atmospheric pressure; however, it is an advantage of the cathode of this invention that air at atmospheric pressure is readily employed.

Electrolyte-containing hydrogen peroxide is removed through outlet 6 and used as such or processed to concentrate or purify the hydrogen peroxide. When an alkaline electrolyte is employed, the peroxide is obtained as a salt. The free hydrogen peroxide is readily regenerated by suitable techniques, such as ion exchange with an acidic cation exchange resin.

The structure and composition of the cell elements other than the cathode form no part of this invention, and are well known to the art. For example, the anode can be formed of any suitable inert, electrically conductive substance, such as nickel, coated with a layer of conducting nickel oxide or other suitable metal, the separator is of any suitable porous material through which electricity can pass with a minimum of water transport such as ion exchange membranes. The special conditions in this system are given by the pressure of an oxidizing agent in an alkaline electrolyte. It was found that the polyfluorosulfonic acid membranes which are marketed by Dupont under the trademark "Naflion" permitted a minimum of $H_2O$ and $H_2O_2$ transport and had excellent chemical stability combined with low ohmic resistance. The end members can be any chemically inert, non-conductive, physically strong material.

The cathode is the key element which enables efficient production of low-cost hydrogen peroxide in accordance with this invention, and is a liquid impermeable but gas permeable membrane comprised of finely divided, highly porous carbon dispersed in a hydrophobic, chemically inert fluorocarbon polymer.

The finely divided porous carbon which is employed to form this membrane in accordance with this invention generally has a particle size in the range of from about 10 to about 500 millimicrons, and has a porosity (or surface area) of from about 10 to about 100 square meters per gram. Illustrative of such carbons are the carbon black and powdered activated charcoal of commerce. A preferred carbon black is acetylene black having a particle size of from about 40 to about 55 millimicrons and a surface area of from about 40 to about 70 square meters per gram. Graphite carbon cannot be employed, however, because it catalyses the decomposition of hydrogen peroxide.

The fluorocarbon polymers which are useful in accordance with this invention are polymers of vinylidine fluoride and other fluorine-containing monomers of the general formula $RR^1C=CF_2$ wherein each of R and $R^1$ is hydrogen or halogen, preferably fluorine, and R can also be trifluoromethyl. Preferred monomers are those of the formula $R^2CF=CF_2$ Wherein $R^2$ is fluorine, chlorine or trifluoromethyl. Illustrative monomers include vinylidine fluoride, tetrafluoroethylene, monochlorotrifluoroethylene, hexafluoropropylene. Suitable polymers include homopolymers or copolymers of these monomers or copolymers with vinyl fluoride. The molecular weight and structure of these polymers are not critical to this invention, provided the polymer has sufficient structural integrity to permit its use as the cathode membrane. Polytetrafluoroethylene, which is sold by DuPont under the trademark Teflon, is preferred. Membranes formed of mixtures of polytetrafluoroethylene and polymonochlorotrifluoroethylene are also highly desirable. The fluorocarbon polymer is in the form of a finely divided solid, preferably having a particle size not greater than about 0.5 micron, when admixed with the carbon.

The ratio of carbon to fluorocarbon polymer in the cathode membrane of this invention is not narrowly critical, and will depend upon the particular characteristics desired. In general, electrical conductivity and porosity of the membrane increase and tensile strength of the membrane decreases with increasing carbon content, and useful membranes can contain from about 5 to about 90 weight percent fluorocarbon polymer and from about 95 to about 10 weight percent carbon. Membranes having an optimum balance of porosity, conductivity and strength are obtained at approximately equal parts by weight of carbon and polymer, i.e., from about 45 to 55 weight percent polymer and from about 55 to about 45 weight percent carbon.

The membrane is formed by mixing the finely divided carbon and finely divided particles of the polymer together to from a homogeneous mixture and then sintering the polymer particles to form the porous membrane, desirably having a thickness of from about 0.1 to about 2 mm, and preferably from about 0.4 to about 0.6 mm.

In a preferred technique the carbon is mixed with an aqueous dispersion of the fluorocarbon polymer to form a homogenous slurry. The slurry is then formed into a sheet and the sheet is heated to drive off the water and sinter the polymer. For example, when employing a commercially available emulsion of 60 percent polytetrafluoroethylene in water (Teflon 30N), a slurry containing equal parts of carbon and polymer on a dry basis is formed at room temperature and then rolled into a sheet. The sheet is desirably subjected to sufficient pressure to expel some of the water. Pressures of from about 1 to about 20 kilograms per square centimeter are useful, with pressures at the upper end of this range (i.e., above about 10 kg/sq.cm) being preferred.

A second rolling process is then performed at moderately elevated temperatures, e.g., at temperatures of from about 80°C. to 120°C., and preferably at about 90°C. to drive off additional water. Finally the sheet is heated at temperatures of from about 100°C. to about 150°C., preferably about 120°C., to complete the drying process, and is then briefly subjected to temperatures of from about 325°C. to about 375°C., preferably about 350°C., to fuse or sinter the polymer particles. The resulting product is a tough, flexible sheet which has a density in the range of from about 0.4 to about 0.8 grams per cubic centimeter which is permeable to oxygen but is impermeable to water.

The membrane can be used as such, particularly at the higher carbon contents. It is preferred, however, to make electrical contact to the membrane with a porous, electrically conductive material. Suitable contact members include metal gauzes, screens and the like, porous graphite or other porous members. The structural strength of the membrane can be enhanced by encorporating fibrous materials, such as glass or polymeric fibers within the membrane itself.

The electrolyte which is employed is an alkaline aqueous electrolyte, and preferably is an aqueous solution of an alkali metal hydroxide (e.g., sodium, potassium or lithium hydroxide) or an alkali metal carbonate (e.g., sodium or potassium carbonate), hydroxides and carbonates of sodium and potassium being preferred. The concentration of the electolyte is not a part of this invention, and concentrations sufficient to achieve adequate conductivity are readily achieved by those of ordinary skill in the art. An especially preferred electrolyte is one normal sodium hydroxide. When such electrolytes are employed, most of the hydrogen peroxide will be produced in the form of its monoalkali metal salt, e.g., the monosodium or monopotassium salt. Hydrogen peroxide can be recovered from these salts by known techniques, such as by treating the peroxide-containing electrolyte with an acidic cation exchange resin. Alternatively, where the alkali metal salt of hydrogen peroxide can be employed, such desalting procedures can be dispensed with.

The following examples are illustrative. All parts and percentages are by weight.

EXAMPLE 1

Acetylene black having a particle size of 40–50 $\mu$ is admixed with a 60 percent aqueous dispersion of polytetrafluoroethylene (Teflon 30N) and additonal water in proportions sufficient to provide a slurry containing one part of each carbon black and polytetrafluoroethylene and 10 parts of water. The slurry is then rolled at room temperature to form a sheet under a pressure of 10 kg/cm². The rolling procedure is repeated at about 90°C. and the sheet is then heated at 120°C. for about 2 hours. Finally, the sheet is heated at 350°C. for 3 minutes, and cooled to room temperature. The resulting membrane is a flexible, leather-like material having a density of 0.5 gm/cc and which is permeable to oxygen but impermeable to water. A metal gauze is then pressed onto one side of the membrane to serve as an electrical contact. The metal should be one having good corrosion resistance to a combination of hydrogen peroxide and caustic alkali solution such as, e.g., nickel and stainless steel.

The resulting membrane is formed into a cylinder with the nickel gauze being on the outside surface, and employed as the cathode of a cell such as that illustrated by FIGS. 1–3. The anode is a porous nickel electrode. The separator is an ion exchange membrane tube having an outer diameter of 3 cm and a thickness of 0.05 mm. The distance between the outer edge of this tube and the inner edge of the carbon membrane is 3 mm.

The electrolyte is a one molar solution of potassium hydroxide in water. The total length of the reactor is 25 cm and the electrolyte is transferred through it at a rate of 125 ml/h.

A D.C. power supply is connected to the electrodes and, at an applied voltage of 2.4 V a total current of 5 amps passes through the system. The outer surface of the cathode is exposed to the ambient air, and oxygen from the air diffuses into the pores of the cathode and contacts the electrolyte.

The oxygen in the air is reduced to hydrogen peroxide at the air/electrode/electrolyte interface and the hydrogen peroxide, as such or as the monopotassium salt, diffuses into the bulk of the cathode compartment and is transported from there with the electrolyte to the outlet of the device. The solution leaving the reactor has a hydrogen peroxide concentration of 2.4 percent which is equivalent to a current efficiency of 94.6 percent.

EXAMPLE 2

The experiment of Example 1 is repeated except that the electrolyte is a five molar solution of potassium carbonate in water which rests stationary inside the reactor.

Hydrogen peroxide is formed with an initial current efficiency of 100 per cent, which decreases with increasing hydrogen peroxide concentration, until a concentration of 10 grams of hydrogen peroxide per 100 grams of water is achieved. Thereafter the rate of decompositon of the hydrogen peroxide equals the rate of formation.

EXAMPLE 3

The experiment of Example 1 is repeated, except that the metal gauze used as the cathode contact is replaced by a membrane comprised of 5 parts graphite dispersed in 95 parts of polytetrafluoroethylene made by a procedure similar to that employed in forming the cathode membrane, with similar results.

EXAMPLE 4

The experiment of Example 1 is repeated, except that the cathode membrane is made from activated charcoal (Darco G60, sold by the Darco Division of Atlas Chemical Industries, Inc.), and has a density of 0.7 gm/cc, with similar results being obtained.

It is the essence of this invention that the cathode membrane be porous. It is for this reason that sintering of the particulate polymer is employed. When the pore diameter is sufficiently small, the hydrophobic nature of the polymer prevents penetration of the aqueous electrolyte into the pore. The pores of the membrane will have diameters both above and below this pore size, thus allowing both the electrolyte and the oxygen to penetrate and contact within the body of the membrane. It is desired, however, that the porosity of the membrane be such that it is impermeable to water. Thus, the membrane should be free of large pores extending all the way through which would permit transfer of electrolyte through the membrane. This balanced porosity is readily achieved by the sintering procedure which has been described.

As noted previously, the cell disclosed and illustrated above, can be employed in a system useful for environmental control or for disinfection purposes. As illustrated in FIG. 4, such a system includes means for providing demineralized water 10, means for rendering the demineralized water basic 12, means for generating hydrogen peroxide, such as a cell of the present invention 14, means 16 for desalting the hydrogen peroxide solution produced in generating means 14, and means for bringing the resulting hydrogen peroxide solution into contact with the locus to be treated.

The nature of demineralizing means 10 is not critical to this invention, provided it is effective to reduce the concentration of mineral salts to a level which does not materially interfere with the subsequent generation of hydrogen peroxide. Ordinary ion exchange techniques are adequate for most applications.

In the mixing means, which can be a mixing tank or pump or merely a junction of two pipes, an alkaline substance is admixed with the demineralized water to render it basic. As noted above, the electrolyte used in generator 14 is an aqueous alkaline electrolyte.

In generator 14, hydroxide ions are consumed at the anode by the reaction

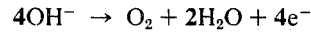

$$4OH^- \rightarrow O_2 + 2H_2O + 4e^-$$

while hydroxide ions are generated at the cathode by the reaction

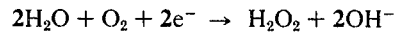

$$2H_2O + O_2 + 2e^- \rightarrow H_2O_2 + 2OH^-$$

Thus, to avoid depletion of the electrolyte at the anode, it is essential to assure rapid transport of hydroxyl ions from cathode to anode. This may be facilitated by pumping the caustic alkali electrolyte first through the anode and then through the cathode compartment.

The nature of desalting means 16 is not critical to this invention, and desalting processes which are well known to the art can be employed. Processes developed for this purpose include, e.g., ion exchange, reverse osmosis, electrodialysis, and the like. Various systems which are resistant to oxidizing agents and to alkaline solutions are known and may be used. The preferred method of desalinization is a process in which the alkali ions are transferred through a membrane as a result of the application of electric energy, i.e., electrodyalisis (See, e.g., S. B. Tuwiner "Diffusion and Membrane Technology," Reinhold Publishing Corp., New York, N.Y. 1962). Good results were obtained with 0.05 mm thick polyfluorosulfonic acid (Naflion)

membranes. The thickness of the membranes should be as small as possible in order to reduce the ohmic resistances and with it energy losses which lead to heating of the system and reduced stability of the hydrogen peroxide.

The thus produced hydrogen peroxide solution is then contacted with the locus to be treated. The conditions of contact will vary widely, depending upon the treatment to be effected. These conditions form no part of the present invention. In many cases they are well known or are readily determinable through simple experimentation. In many areas of use, it may be desirable to monitor the effectiveness of the treatment, with suitable feed-back to adjust the current to generator 14 to generate the amount of hydrogen peroxide necessary. For example, in treating polluted water either the concentration of the hydrogen peroxide or the concentration of the contaminant can be monitored, and the rate of hydrogen peroxide generation adjusted accordingly (i.e., to achieve a desired hydrogen peroxide or contaminant concentration). Suitable feed-back arrangements and monitoring devices are known and form no part of this invention.

The following examples illustrate the use of hydrogen peroxide solutions produced in accordance with this invention for various environmental control applications.

EXAMPLE 5

As a model for effluent wastes, an aqueous solution of 50 mg/l phenol was used. After the pH of the solution was adjusted to 3 with a standard acetate buffer it smelled strongly of phenol. To this liquid, 2 ml of a 3 percent solution of hydrogen peroxide produced as described above was introduced together with 1 ml of a solution containing 100 g/l ferrous chloride. By spectroscopic analysis it was shown that in 2 minutes the phenol concentration had decreased to 3 mg/l, and after 5 minutes no phenol was detectable and the solution had completely lost its characteristic smell. It is believed that in this case the mixture of hydrogen peroxide and a ferrous salt functions as an oxidizing agent through the formation of hydroxyl free radicals according to the equation $Fe^{2+} + H_2O_2 \rightarrow Fe^{2+} + OH^- + OH$. H. R. Eisenhauer has suggested in J. Water Pollution Control Federation, 36, 1116–1128 (1964) that the mechanism of phenol oxidation may be represented by:

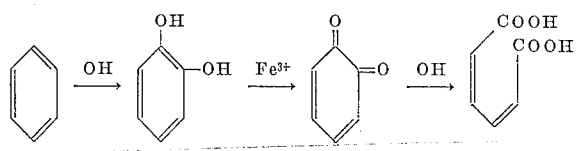

The last compound (Muconic acid) has no particular smell and it seems to have no adverse physiological properties.

EXAMPLE 6

Cyanide ions belong to the most toxic compounds known and must thus be rigorously removed from industrial effluents. The permissible concentration in waste water is about 0.01 – 0.1 mg/l. Cyanides are common pollutants in the wastes of the coking and the metal surface treatment, in particular the galvanic, industries. As a model for a waste effluent containing cyanide ions an aqueous solution containing 3 g/l of KCN was used. Into 1 liter of this solution, 80 ml of a 5 percent solution of hydrogen peroxide was added. It was found that in 9 minutes 50 percent of the cyanide ions had reacted and after 1 hour 99 percent. After 2 hours no more cyanide ions were detectable.

A more detailed investigation of the reaction between hydrogen peroxide and potassium cyanide revealed that the following reactions seemed to take place:

1. $KCN + H_2O_2 \rightarrow KCNO + H_2O$
2. $KCNO + 2H_2O \rightarrow K(NH_4)CO_3$
3. $KCN + 2H_2O_2 \rightarrow HCOOK + NH_3$ It was found that 80 percent of the KCN is converted to $K(NH_4)CO_3$ and the rest reacts according to equation 3, this reaction being catalyzed by hydrogen peroxide. The rate of these reactions was found to be reduced considerably if the pH of the solution was allowed to be less than 7 or greater than 9.

It was necessary at all times to work with an excess of hydrogen peroxide, otherwise the reaction was found to proceed by equation 1 only. As the cyanate ion itself is known to be toxic, it must thus always be assured that a large excess of $H_2O_2$ (at least twice as much as theoretically necessary) is applied for this process.

EXAMPLE 7

It has long been known that hydrogen peroxide is an efficient disinfecting agent (See, e.g., E. Ungermann, Hygien. Rundschau 23, 1137, (1913)). Its bactericidal properties have recently been reinvestigated in detail and it was shown that through addition of suitable homogenous catalysts, e.g., $Fe^{2+}$ ions, the rate of destruction of pathogenic terms may be adjusted to values which are comparable to that of chlorine (L. Colbert et al, Ann. Inst. Pasteur 101, 278 (1962); Y. Peloux et al., Ann. Inst. Pasteur, 101, 6 (1962)). In order to demonstrate the stability of hydrogen peroxide in water and with it the ability to give residual protection, experiments were made with a swimming pool as follows:

The water of an open air pool with a total volume of 7 cubic meters was treated with hydrogen peroxide over a period of 2 months, during which time the pool was used a total of 23 hours by adults and 8 hours by children. It has been reported (F. Steinbrunn in "Chemie und Praxis der Schwimmbadpflege," and in "Vom Wasser," ed. W. Husmann, Verlag Chemie GmbH, Weinheim/Bergstrasse (1971)) that 3–4.5 mg/l would be an adequate $H_2O_2$ concentration for treatment of swimming pool water. When the $H_2O_2$ level was adjusted to about 50 mg/l, it was found that the concentration decreased by about 5 mg/l per day. During the period of the experiment the water temperature changed from a maximum value of 24°C. at the beginning to minimum value of 14°C. at the end. The hydrogen peroxide level in a pool of this size could be kept constant by utilizing a hydrogen peroxide generator in form of a cylinder with a height of 25 cm and with a diameter of the base of 5 cm for 2 hours every day at an applied voltage of 3 Volts and a current of 8 amps. The water in this pool was of outstanding quality, it was completely free of odor and taste and no irritation of eyes or skin occurred.

The use of the equipment described by this invention is by no means restricted to the treatment of waste water only. There are many possiblities for the application of hydrogen peroxide containing aqueous solution in the food processing industry and in farming. A common application is the sterilizaiton of containers and other equipment as well as the cleaning and disinfection of stables and animals, which is particularly important for accelerated farming methods.

There are in addition numerous cases where direct treatment of foodstuffs with hydrogen peroxide solutions have been recommended, e.g., for improvement of the storage ability of crops in an environment of high humidity (U.S. Pat. No. 3,445,246 issued Apr. 14, 1970), for the removal of the smell, taste and off-water of fish meal (Netherlands Pat. No. 6,512,234 published Mar. 23, 1967), for the treatment of egg products for protection against Salmonella infections (Arch. Gefluegelk, 28, 326-41 (1964)), for the preparation of milk with low bacterial count (Dairy Sci. Abstr. 28, 517 (1966)) etc. For all these and similar applications the equipment described in this invention may be conveniently applied. The output of desalinator 16 will then have to be connected to an appropriate treating vessel.

Another important application of the equipment described in this invention is in the field of air pollution control. A common process for treatment of polluted air is scrubbing with a liquid which has dissolved or dispersed various media which react with the pollutant (See, e.g., S. Calvert in "Air Pollution" ed. A. C. Stern, Academic Press, New York, Vol. III, 457 (1968)). Aqueous solutions of $H_2O_2$ can be used to scrub gases containing $SO_2$, $H_2S$, NO (See, e.g., Khim. Tekhnol. 13, 77-81 (1968) (Russ.)) and all other systems which react with $H_2O_2$. It reacts, e.g., with $SO_2$ to form $H_2SO_4$ $$SO_2 + H_2O_2 \rightarrow H_2SO_4$$

and with $H_2S$ to form sulfur $$H_2S + H_2O_2 \rightarrow S + 2H_2O.$$

For this application the output of desalinator 16 is connected to a scrubber, resulting in the injection of an aqueous solution of $H_2O_2$ into the gas stream.

EXAMPLE 8

For demonstration an air scrubber was used with a total volume of about 20 l which was filled with lead spirals. Liquid was injected into the top of the scrubber with the help of a jet spray head (Jato D215 with 5 Jets DIII, size 5) at a rate of 18 l/min. A mixture of $SO_2$ in air was prepared containing 1.19% $SO_2$. This gas mixture was blown through the scrubber with the help of a fan at the rate of 72 m³/h. The liquid was a solution of 0.1% $H_2O_2$ on 20% $H_2SO_4$. It was found that at the exit of the scrubber the $SO_2$ content of the air had been reduced to 0.11 percent, i.e., 92 percent of the $SO_2$ had been removed. If the $H_2O_2$ was omitted from the solution it was found that no $SO_2$ was removed from the gas mixture.

What is claimed is:

1. An improved process for producing aqueous hydrogen peroxide including the step of passing an electric current through an aqueous electrolyte between an anode and a cathode wherein one surface of said cathode is in contact with said electrolyte and another surface of said cathode is in contact with an oxygen containing gas, wherein the improvement comprises employing as said cathode a flexible, gas-permeable membrane having a thickness of from about 0.1 to about 2 millimeters and a density of from about 0.4 to about 0.8 grams per cubic centimeter, said membrane consisting essentially of from about 95 to about 10 weight percent of finely divided, porous, high surface area carbon dispersed through from about 5 to about 90 weight percent of sintered, finely-divided particles of a hydrophobic polymer of a monomer of the fomula:

$$RR^1C = CF_2$$

wherein R is hydrogen, halogen or trifluoromethyl and $R^1$ is hydrogen or halogen, said carbon having a particle size of from about 10 to about 500 millimicrons and said polymer having a particle size of not greater than about 0.5 microns before sintering.

2. A method according to claim 1 wherein said carbon has a particle size in the range of from about 40 to about 55 millimicrons and a surface area of from about 40 to about 70 square meters per gram.

3. A method according to claim 1 wherein said polymer is of a monomer of the formula $R^2CF=CF_2$ wherein $R^2$ is chlorine, fluorine or trifluoromethyl.

4. A method according to claim 1 containing from about 45 to about 55 weight percent polymer and from about 55 to about 45 weight percent carbon.

* * * * *

UNITED STATES PATENT OFFICE
CERTIFICATE OF CORRECTION

Patent No. 3,856,640          Dated December 24, 1974

Inventor(s) Kurt Halfar, Michael L. Hitchman and Wolfgang Mehl

It is certified that error appears in the above-identified patent and that said Letters Patent are hereby corrected as shown below:

Column 12, claim 1, line 21, after gas-permeable insert --and liquid-impermeable--.

Signed and Sealed this

Tenth Day of August 1976

[SEAL]

Attest:

RUTH C. MASON
*Attesting Officer*

C. MARSHALL DANN
*Commissioner of Patents and Trademarks*